(12) United States Patent
Schell (10) Patent No.: US 7,942,254 B2
(45) Date of Patent: May 17, 2011

(54) CORRUGATED-CARDBOARD-STRIP CONVEYOR DEVICE

(75) Inventor: Markus Schell, Weiden (DE)

(73) Assignee: BHS Corrugated Maschinen-und Anlagenbau GmbH, Weiherhammer (DE)

( * ) Notice: Subject to any disclaimer, the term of this patent is extended or adjusted under 35 U.S.C. 154(b) by 280 days.

(21) Appl. No.: 12/251,007

(22) Filed: Oct. 14, 2008

(65) Prior Publication Data

US 2009/0096158 A1   Apr. 16, 2009

(30) Foreign Application Priority Data

Oct. 12, 2007   (DE) .......................... 10 2007 049 424

(51) Int. Cl.
*B65G 47/26* (2006.01)
(52) U.S. Cl. .................... 198/419.3; 198/429; 198/689.1
(58) Field of Classification Search ............... 198/419.3, 198/429, 689.1, 717, 725, 726, 728
See application file for complete search history.

(56) References Cited

U.S. PATENT DOCUMENTS

| | | | | |
|---|---|---|---|---|
| 2,619,237 A | * | 11/1952 | Socke | 198/428 |
| 5,261,522 A | * | 11/1993 | Guttinger et al. | 198/429 |
| 6,755,606 B2 | * | 6/2004 | Luebben et al. | 198/419.3 |
| 2004/0011625 A1 | * | 1/2004 | Malini | 198/419.3 |
| 2004/0195074 A1 | * | 10/2004 | Iwasa et al. | 198/431 |

FOREIGN PATENT DOCUMENTS

| | | |
|---|---|---|
| DE | 1038896 | 9/1958 |
| DE | 2033326 | 2/1971 |
| DE | 3513354 A1 | 1/1986 |
| DE | 69911194 T2 | 7/2004 |
| DE | 10312600 A1 | 9/2004 |

* cited by examiner

*Primary Examiner* — James R Bidwell
(74) *Attorney, Agent, or Firm* — Browdy and Neimark, PLLC (57) ABSTRACT

The invention relates to a device for conveying strips of corrugated cardboard, the device comprising a work table for conveying strips on the work table along a direction of conveyance, wherein the work table is supported on a floor and comprises at least one longitudinal groove for accommodating an element which is displaceable therein, and at least one slide which is disposed underneath the work table and is actuable for displacement in the direction of conveyance, which slide comprises an element which is actuable for upward extension through the at least one longitudinal groove for cooperation with the strip.

9 Claims, 10 Drawing Sheets

CORRUGATED-CARDBOARD-STRIP CONVEYOR DEVICE

BACKGROUND OF THE INVENTION

Field of the Invention

The invention relates to a device and a method of conveying strips of corrugated cardboard.

SUMMARY OF THE INVENTION

It is the object of the invention to provide a device and a method of conveying strips of corrugated cardboard. The object is achieved by a device for conveying strips of corrugated cardboard, the device comprising
a. a work table for conveying strips on the work table along a direction of conveyance, the work table being supported on a floor;
b. wherein the work table comprises at least one longitudinal groove for accommodating an element which is displaceable therein, and
c. at least one slide which is disposed underneath the work table and is actuable for displacement in the direction of conveyance;
d. which slide comprises an element which is actuable for upward extension through the at least one longitudinal groove for cooperation with the strip.

Furthermore, this object is achieved by a method of conveying strips of corrugated cardboard, the method comprising the following steps:
providing a device according to the invention;
extending elements in the direction of conveyance so as to be positioned in front a group of strips to be conveyed,
extending elements behind a group of strips to be conveyed,
conveying the group of strips along the direction of conveyance.

The gist of the invention is to provide longitudinal grooves extending along a direction of conveyance in a work table. Underneath the work table are located displaceable slides which are driven individually and comprise pins which are upwardly extendable through the longitudinal grooves. The pins enable the slides to be brought in contact with strips of corrugated cardboard to be displaced such that predefined clusters of corrugated cardboard strips are displaced along the work table in a defined manner.

Additional features and details of the invention will become apparent from the description of an embodiment by means of the drawings.

DESCRIPTION OF THE PREFERRED EMBODIMENT

Figure 1:
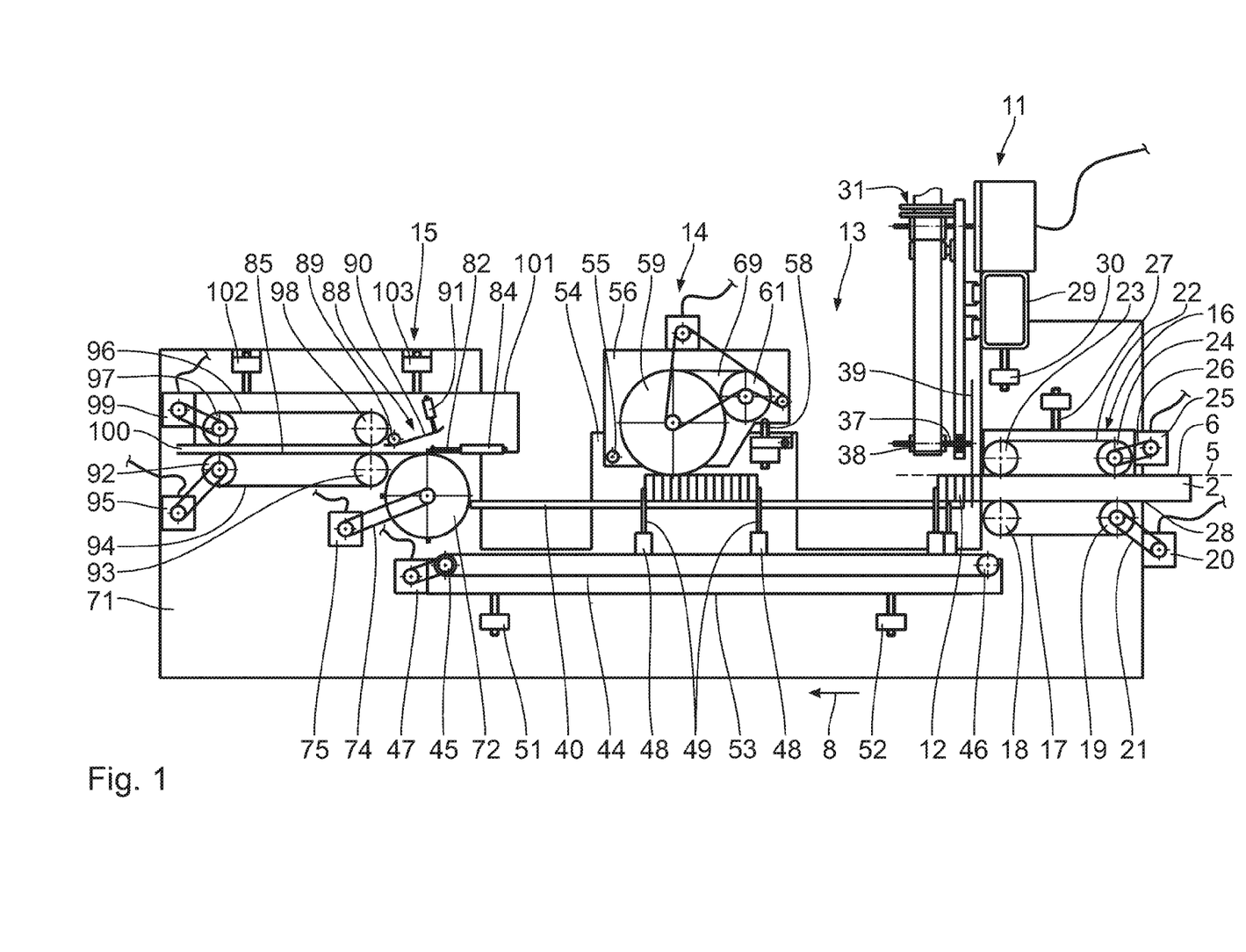
FIG. 1 shows a side view of a machine for producing corrugated honeycomb cardboard.
Figure 2:
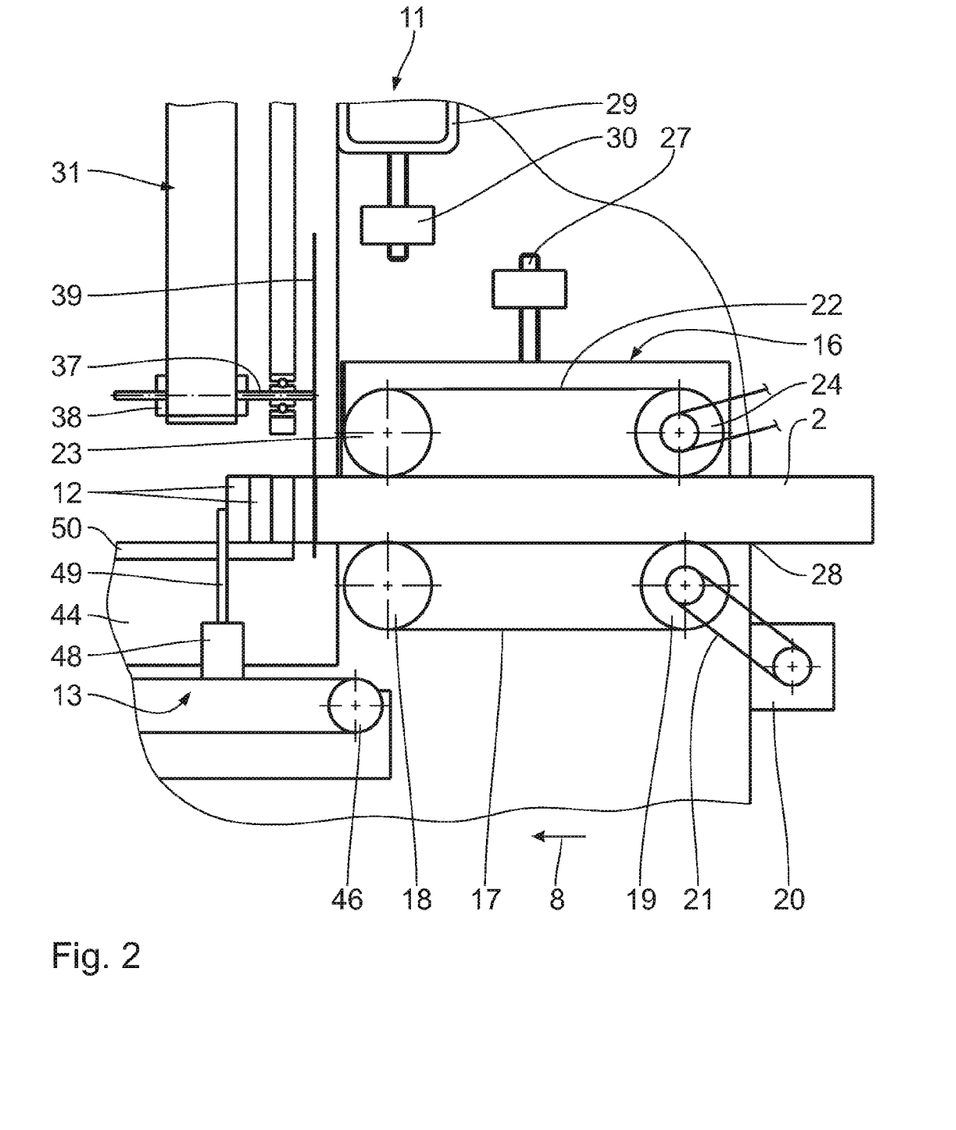
FIG. 2 shows an enlarged sectional view of the cutting device according to FIG. 1.
Figure 3:
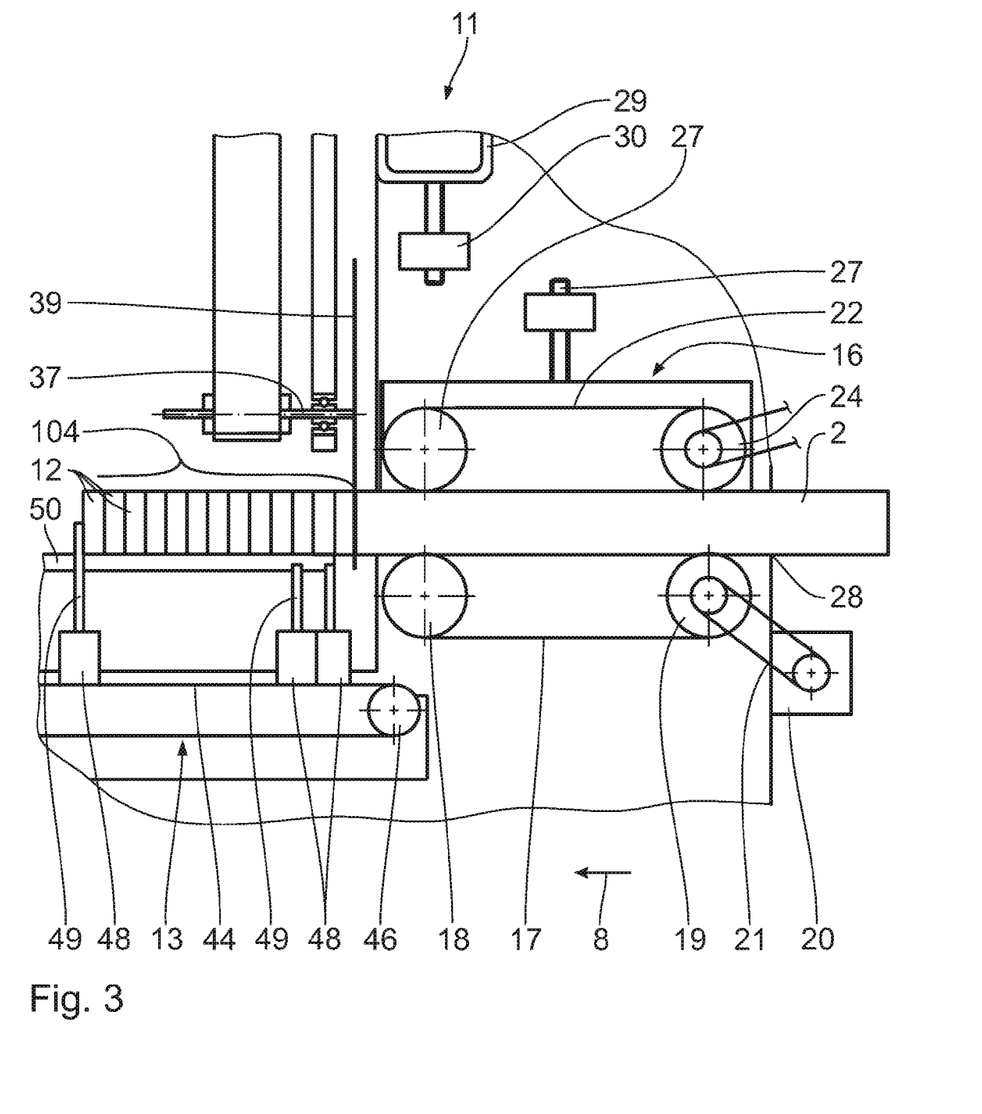
FIG. 3 shows a view according to FIG. 2 with a single stack of corrugated cardboard strips.

The following is a description of a machine for producing corrugated honeycomb cardboard 1. The description starts in the machine according to FIG. 1 with a block 2 of several single-face webs of corrugated cardboard which are glued together on top of each other. Single-face corrugated cardboard is composed of a web of corrugated cardboard 3 and a smooth liner 4 glued thereto. The production of single-face corrugated cardboard in endless webs is known, for instance from DE 103 12 600 A1. In a corrugated cardboard machine, several layers of single-face corrugated cardboard can be glued together on top of each other, thus resulting in a larger sequence of liners, corrugated webs, liners, corrugated webs, etc. which are glued together. Such multilayer webs of corrugated cardboard are cut into sheets, hereinafter referred to as blocks 2, which are stacked at the end of the corrugated cardboard machine. These blocks 2 have a block plane 5 as main plane in which is disposed the top 6 of the block 2. The channels 7 formed between the corrugated web 3 and the liner 4 are parallel to the block plane 5. The blocks 2 at the beginning of the machine according to FIG. 1 are aligned such that the channels 7 are parallel to a horizontal direction of conveyance 8 running from right to left in FIG. 1. In the machine according to FIG. 1, the process starts with a block 2 which is composed of five corrugated webs 3 and liners 4 which are arranged on top of each other in an alternating manner.

Figure 10:
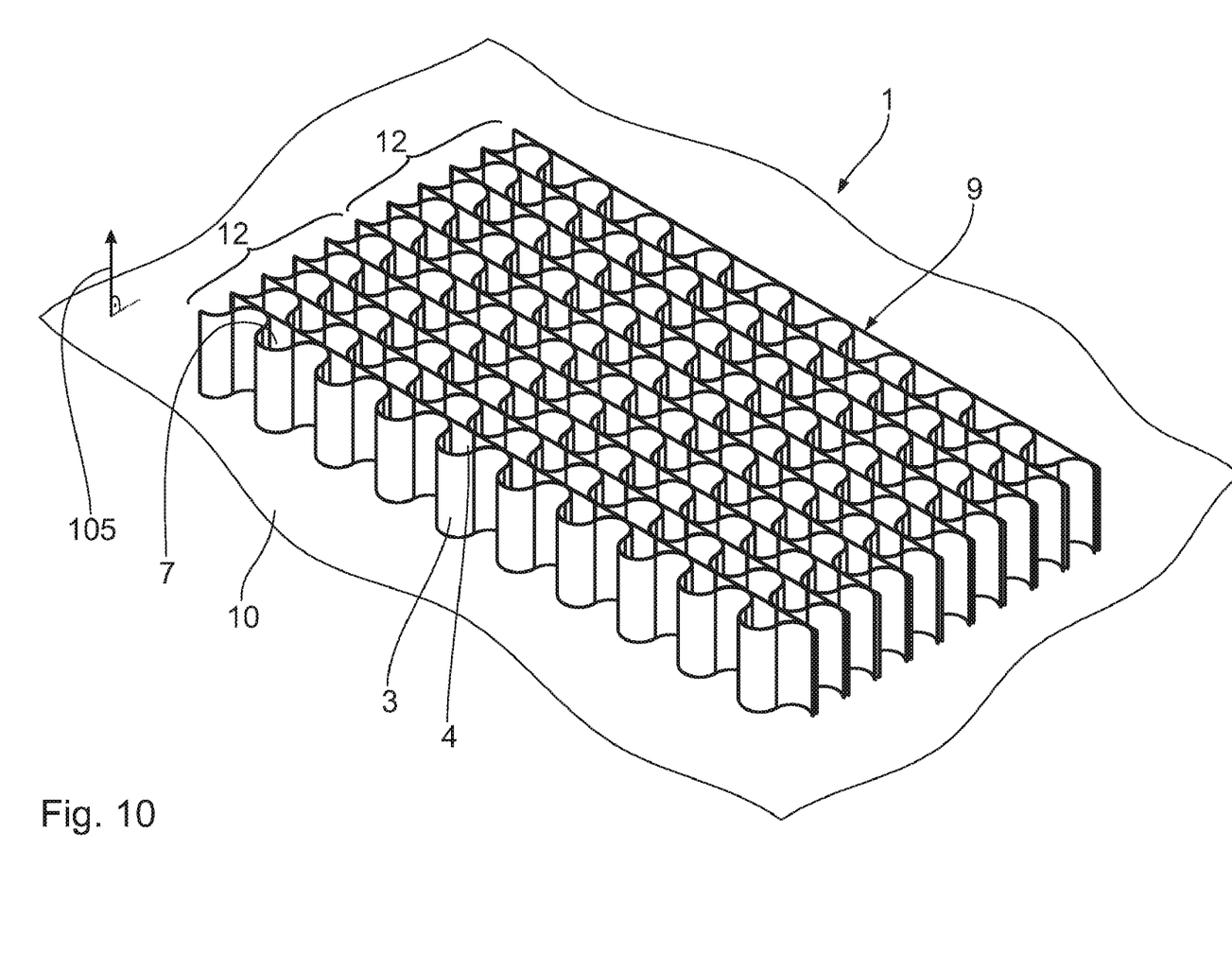
FIG. 10 shows a piece of corrugated honeycomb cardboard.

The product created by means of the machine according to FIG. 1 is referred to as corrugated honeycomb cardboard 1. An example thereof is shown in FIG. 10. The corrugated honeycomb cardboard 1 has a plane top 9 which is disposed in the main plane referred to as corrugated-honeycomb-cardboard plane 10. The corrugated honeycomb cardboard 1 is substantially characterized in that the channels 7 run crosswise, in particular perpendicular to the plane 10 whereas the channels 7 in the initial block 2 ran parallel to the block plane 5. The considerable advantage of the corrugated honeycomb cardboard 1 is that it has a high stiffness in several spatial directions. First of all, it is particularly robust against effects of force acting perpendicular to plane 10. Furthermore, it has a good stiffness when bent about axes which are located in plane 10. Corrugated honeycomb cardboard 1 within the scope of this application is to be considered a cellular material in the broadest sense in which the channels 7 run crosswise to the main plane 10. In order to achieve a higher resistance of the corrugated honeycomb cardboard 1 against external influences such as moisture, the corrugated honeycomb cardboard 1 can also be composed of webs 3, 4 lined with plastic material and/or wax and/or impregnating agents, or the corrugated honeycomb cardboard 1 can subsequently be coated with plastic material upon production thereof. The webs 3, 4 can further consist of paper and/or plastic material and/or webs of material reinforced with fiberglass. Therefore, the term corrugated cardboard or block of corrugated cardboard, respectively, is in the broadest sense to be understood such that the webs of which the corrugated cardboard is made may consist of paper and/or cardboard and/or plastic material and/or webs of material reinforced with fiberglass. Other flexible materials which can be processed accordingly are principally included as well.

Figure 4:
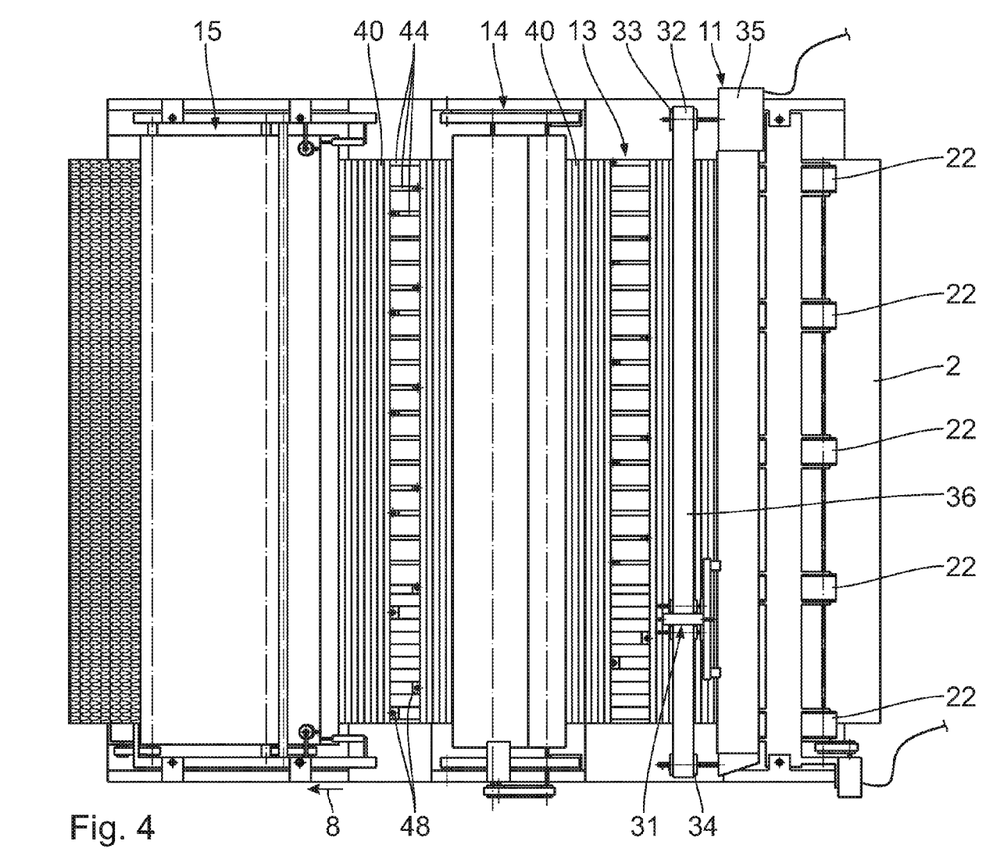
FIG. 4 shows a plan view of the machine according to FIG. 1.
Figure 5:
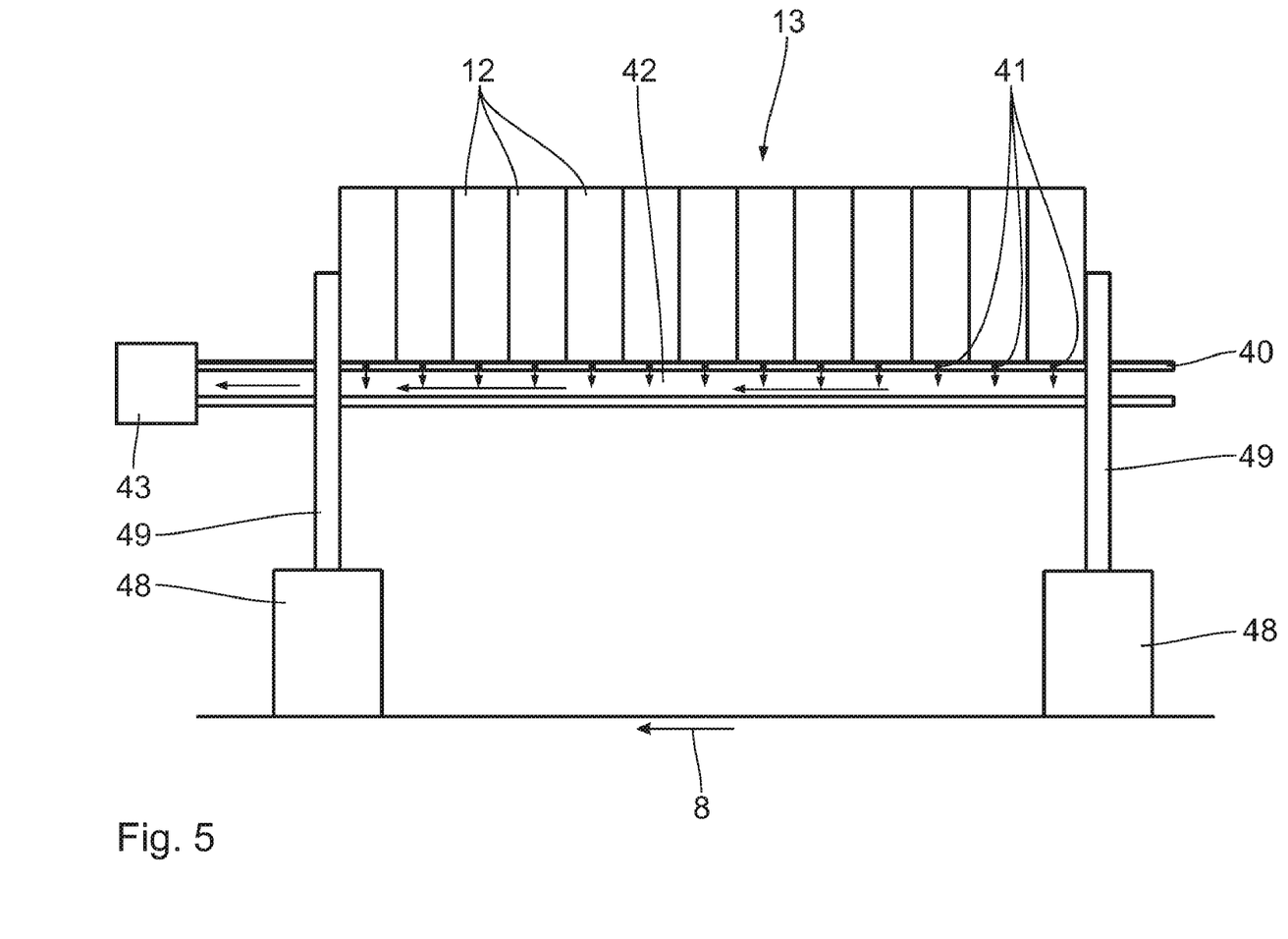
FIG. 5 shows an enlarged view of the conveyor device according to FIG. 1.
Figure 6:
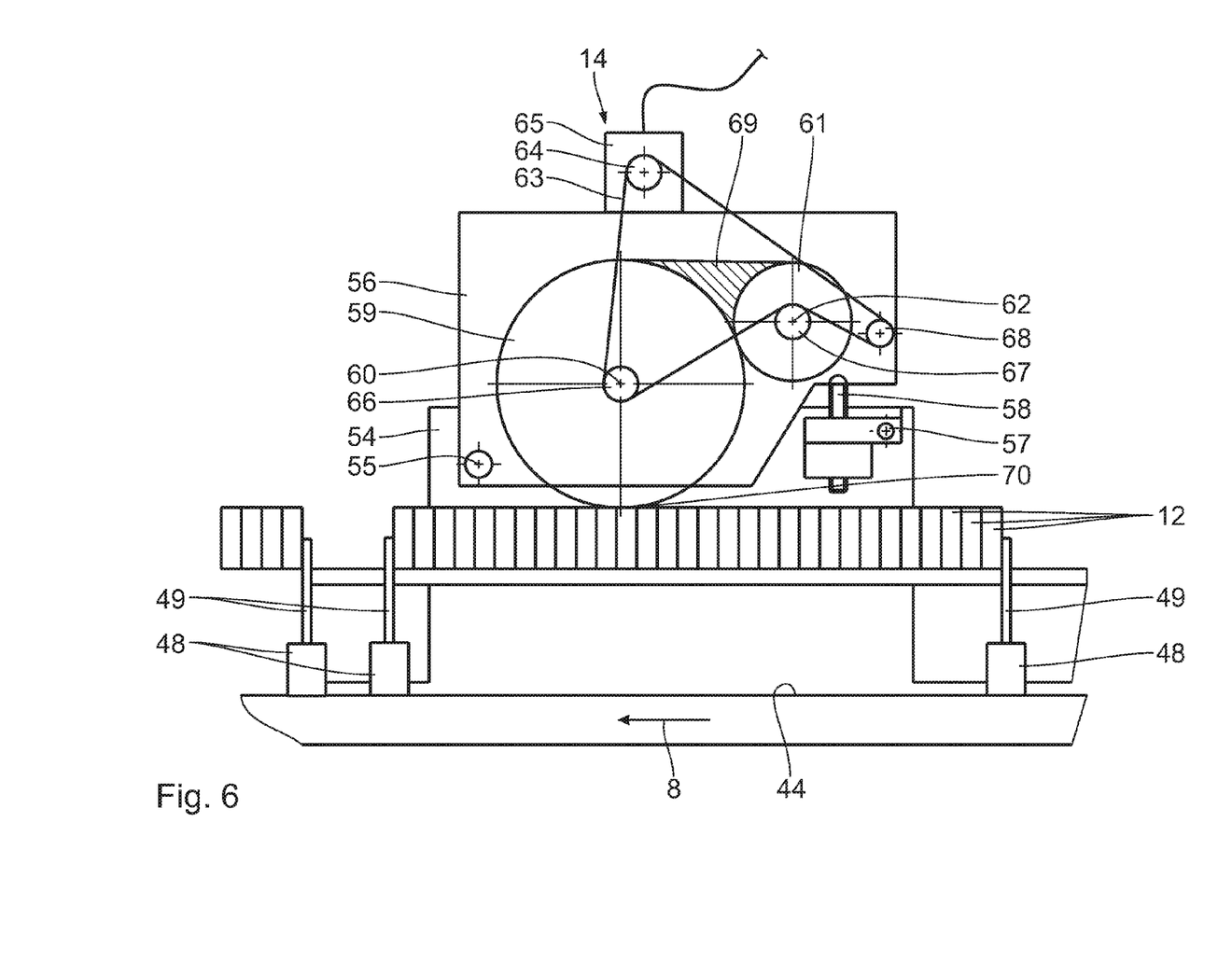
FIG. 6 shows an enlarged view of the gluing device according to FIG. 1.
Figure 7:
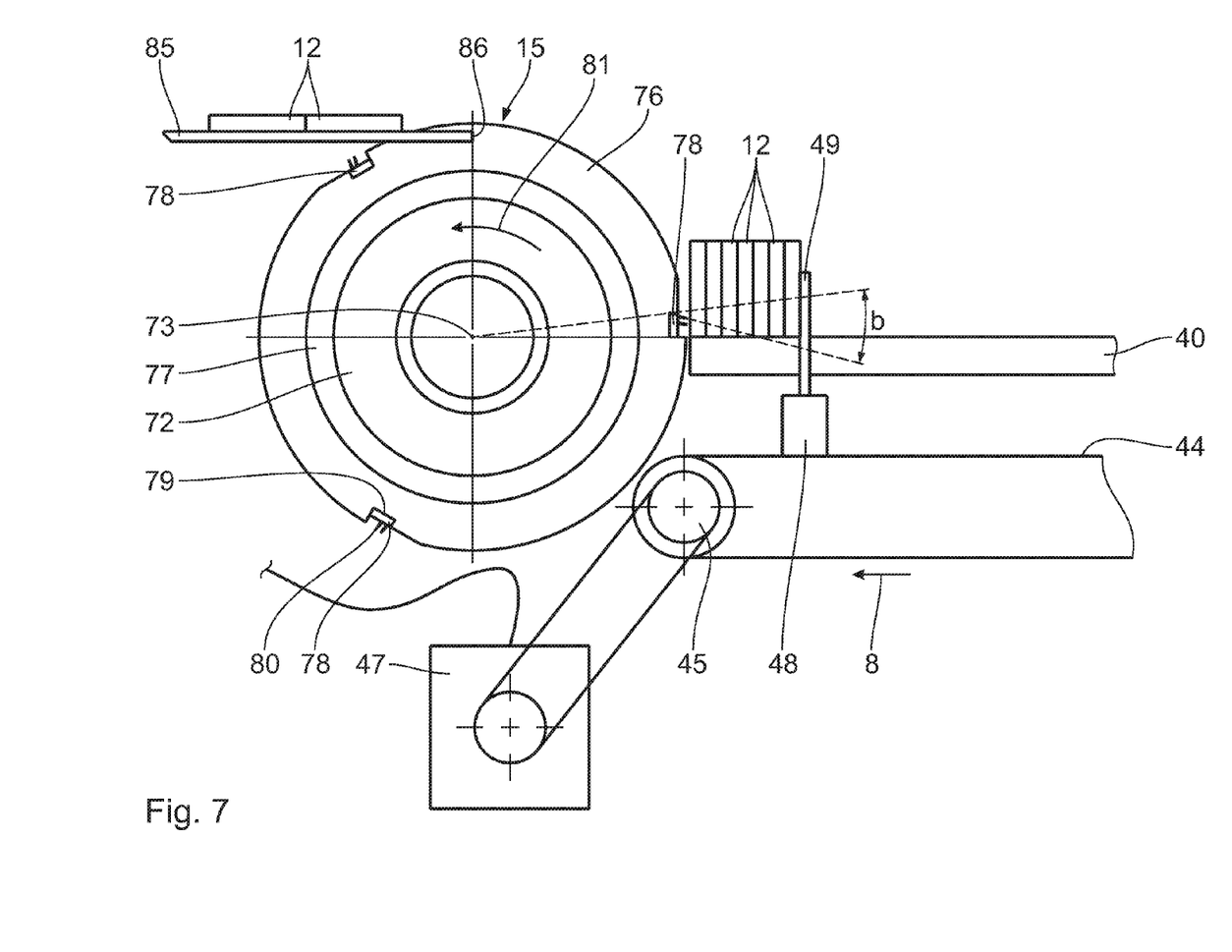
FIG. 7 shows an enlarged view of the corrugated-cardboard-strip turning device according to FIG. 1.
Figure 8:
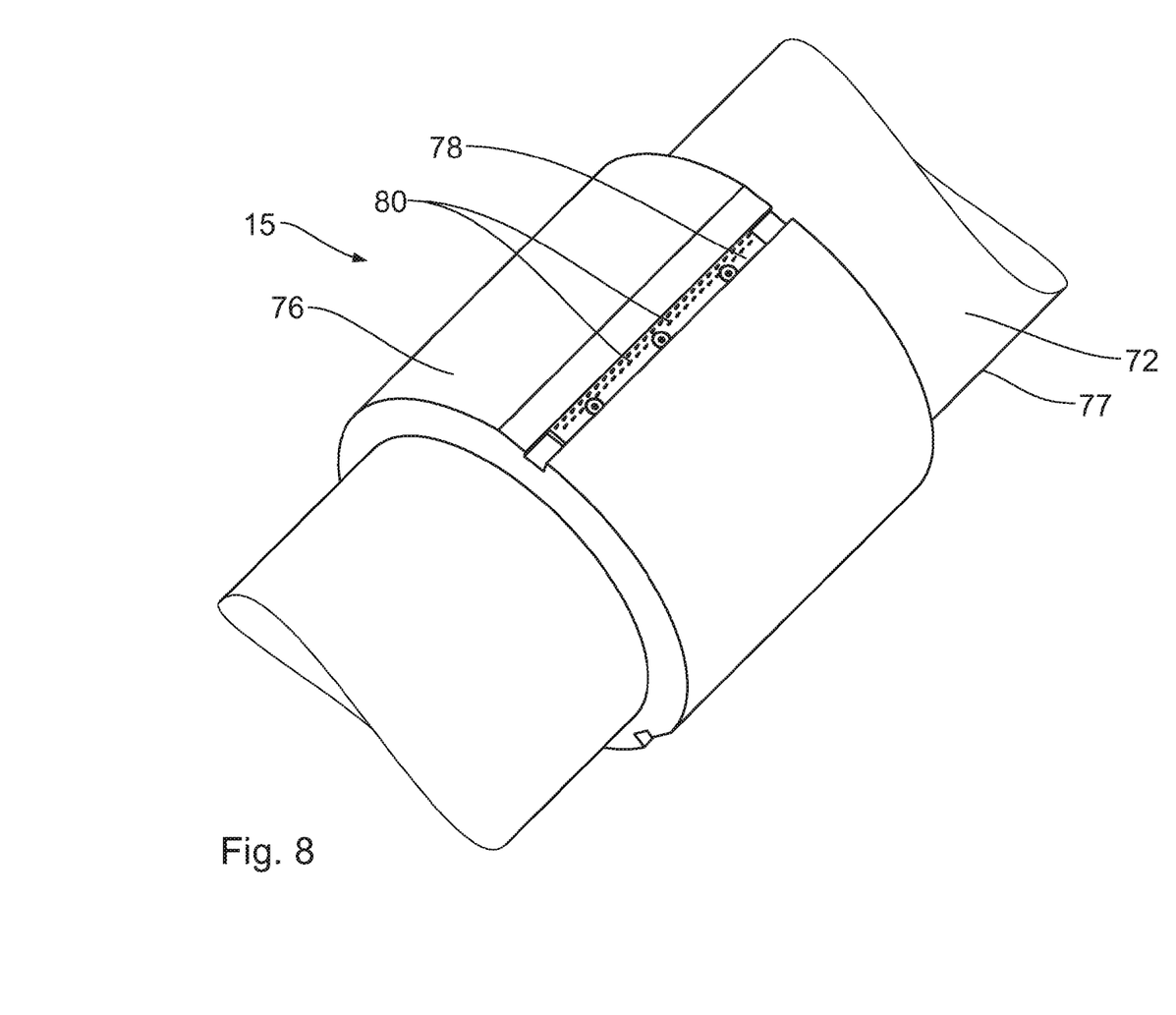
FIG. 8 shows an enlarged view of the turning roller according to FIG. 7.
Figure 9:
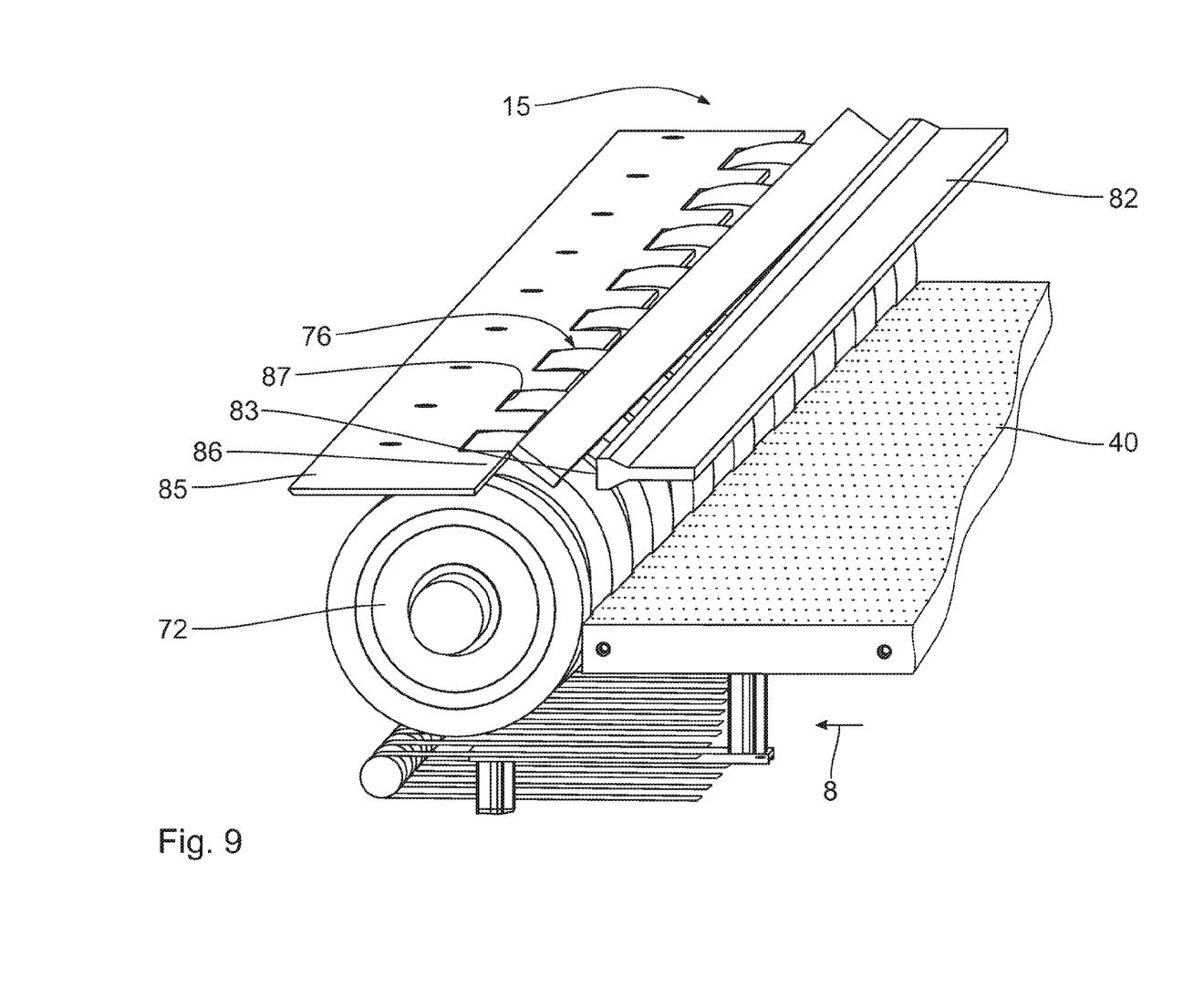
FIG. 9 shows a view of the corrugated-cardboard-strip turning device according to FIG. 7.

A machine shown in FIG. 1 for producing corrugated honeycomb cardboard 1 comprises a cutting device 11 which is disposed in a row along the direction of conveyance 8 for cutting strips 12 from a block 2. Downstream of the cutting device 11 is a conveyor device 13 for conveying the strips 12 along the direction 8 towards a gluing device 14 and then to a corrugated-cardboard-strip turning device 15 disposed downstream thereof. The cutting device 11 comprises a block supplying device 16 comprising a lower endless conveyor belt 17 both ends of which are deflected via two deflection rollers 18, 19 in and opposite to the direction 8, wherein the deflection roller 19 is driven by means of a motor 20 and a drive belt 21. Above and parallel to the conveyor belt 17 is disposed another conveyor belt 22 which is deflected via deflection rollers 23 and 24, wherein the deflection roller 24 is driven by a motor 25 by means of a drive belt 26. The upper conveyor belt 22 is vertically adjustable in height together with the deflection rollers 23 and 24 by means of a height adjustment device 27, wherein said height adjustment is provided for by means of a spindle drive, for example. The height adjustment device 27 enables the gap 28 formed between the conveyor belts 17 and 22 to be adjusted in height, and thus adapted to the thickness of the block 2. Instead of conveyor belts 17, 22 extending across the entire width of the block 2, several belts 17, 22 distributed uniformly across the width of the block 2 may be used as well, as shown in FIG. 4.

Above the block supplying device 16, the cutting device 11 comprises a horizontal crossbeam 29 which is supported on a machine frame, extends perpendicular to the direction 8 and is height-adjustable by means of a height adjustment device 30. A slide 31 is guided on the crossbeam 29 for displacement crosswise to the direction 8. The crosswise displacement takes place by means of an endless gear belt 32 whose transverse ends are deflected via two rollers 33, 34. The roller 33 is drivable for rotation by means of a motor 35. The slide 31 is rigidly connected to the upper part 36 of the gear belt 32 such that when the roller 33 is pivoted, this results in a transverse displacement of the slide 31. The lower part of the slide is provided with a shaft 37 which is mounted thereon for rotation. At the end thereof pointing in direction 8, the shaft 37 is provided with a roller 38 about which is guided the lower part of the gear belt 32. At the other end, the shaft is provided with a circular knife 39. Above the roller 38, two further deflection rollers (not shown) for the gear belt 32 are mounted on the slide 31. All rollers 32, 34, 38 are provided with tooth-shaped recesses which engage with the teeth of the gear belt 32, enabling a slip-free movement to take place. The circular knife 39, which is driven for rotation, cuts the block 2 into strips 12.

When seen in the direction 8, the conveyor device 13 starts behind the block supplying device 16. The conveyor device 13 comprises a work table 40 which is supported on the floor via supports and extends down to the device 15. Running parallel to the direction 8, numerous rows of bores 41 are provided in the work table 40 which lead to vacuum channels 42 disposed underneath thereof and which are open towards the top of the work table 40. Each of the channels 42 is connected to a vacuum generation device 43. The low pressure at the free end of the bores 41 causes strips 12 guided across thereto to be held accurately on the work table. Below the work table 40 are disposed numerous parallel conveyor belts 44 which are arranged next to each other and are deflected via deflection rollers 45, 46, wherein the roller 45 is driven by a motor 47. As can be seen in FIG. 4, numerous, for instance 20, parallel conveyor belts 44 are present crosswise to the direction 8. These conveyor belts 44 are only visible in FIG. 4 because the work table is shown broken open at the respective locations. The conveyor belts 44 arranged next to each other are drivable independently from each other. Each conveyor belt 44 carries at least one slide 48. Each slide 48 is provided with a pin 49 which is upwardly extendable for instance by pneumatic actuation. Above the conveyor belts 44, the work table 40 has continuous longitudinal grooves 50 running parallel to the direction 8, with the extended pins 49 being displaceable therein along the direction 8. The pins 49 are dimensioned such that they are disposed below the work table 40 in the retracted state and are disposed above the top of the work table 40, for instance several centimeters above the top, in the extended state and are thus able to be used for conveying the strips 12. Each of the conveyor belts 44 is height-adjustable together with the slides 48 by means of two height adjustment devices 51, 52 which are mounted below the belts 44 on a frame 53 which carries the belts 44 and rollers 45, 46. In FIGS. 1 to 7, the slides 48 are all shown in the same drawing plane as if they were disposed on the same conveyor belt 44. This is a graphically simplified view. In fact, the slides 48 are in each case disposed on different conveyor belts 44 which are disposed in succession and are actuable independently from each other.

The gluing device 14 comprises a frame 54 which is supported on the ground. An upper support device 56 is articulated to this frame and above said frame via a joint 55. The joint 55 is located at the end of the support device 56 pointing in the direction 8. At the end opposite to the direction 8, a height adjustment device 57 is mounted to the frame 55, said height adjustment device 57 being able to pivot the device 56 about the joint 55 by means of one or several vertically extendable pins 58. A glue application roller 59, whose axis 60 is horizontal and perpendicular to the direction 8, is mounted for rotary drive in the support device 56. On the right of FIG. 6 above the roller 59 is located a squeeze roller 61 with an axis 62 which is parallel to axis 60. The surface of the roller 61 is in direct contact with the surface of the roller 59, wherein the gap between the two rollers 59, 61 is adjustable to ensure a defined amount of glue is applied on the roller 59. The rollers 59 and 61 are drivable for rotation by means of a drive belt 63 which is guided around the shaft 64 of a motor 65, around a shaft 66 of the roller 59, a shaft 67 of the roller 61 and a deflection roller 68. Between the rollers 59 and 61, a substantially triangular space 69 is formed above the rollers 59, 61 which is filled with glue. In a direction crosswise to the direction 8, the space 69 is on both sides delimited by glue dams (not shown) whose contour is adapted to that of the rollers 59 and 61 in the triangular space. The glue dams may be displaceable crosswise to the direction of conveyance. The height adjustment device 57 enables the gap 70 to be adjusted between the lowest point of the roller 59 and the top of the strips 12, thus ensuring an optimal application of glue on the top of the strips 12.

The corrugated-cardboard-strip turning device 15 comprises a turning roller 72, having an axis 73, which is supported on a frame 71 and is mounted for rotary drive. The roller 72 is drivable for rotation via a drive belt 74 by means of a motor 75. The turning roller 72 comprises several spaced-apart rings 76 which are uniformly distributed across the width of the roller 72 and are rigidly connected to the cylindrical surface 77 of the roller 72. Ribs 78 extending parallel to the axis 73 are inserted in respective grooves 79 in the rings 76 and are rigidly connected to the respective ring 76, for instance by screws, gluing or welding. It is advantageous if the ribs 78 are fastened such as to be replaceable. In the present case, each ring 76 is provided with three rib 78 which are uniformly distributed across the periphery, in other words, they are disposed at an angle of 120° with respect to each other. The ribs 78 at the various rings 76 are all disposed at the same angular height, in other words they are in line with each other in the direction of the axis 73. The ribs 78 are provided with numerous outwardly projecting needles 80. The needles 80 are for instance arranged on a matrix of 2×15. The needles 80 are made of steel and have a pointed tip at their radially outer end. The needles 80 typically project from the top of the rib 78 by 3 mm to 10 mm, preferably by 5 mm. Relative to a direction of rotation 81, the needles 80 do not point outwardly in an exactly radial direction but opposite to the direction of rotation 81. Thus, they make an angle b with a radius through the axis 73, wherein to said angle b applies 70°≦b≦110°, preferably b≈80°. This facilitates the removal of the strips 12 pinned thereto. On the right of FIG. 1 above the roller 76, there is a horizontal beam 82 which extends across the width of the roller 76 and has a broadened portion 83 at its front end pointing in the direction 8. The beam 82 is actuable for displacement along and opposite to the direction 8 by means of a pneumatic device 84 arranged opposite to the direction 8. Seen in the direction 8 directly above the roller 72 and beyond the highest point thereof, there is a stripping plate 85 which extends across the width of the roller 72. Opposite to the direction 8, the plate 85 has a front stripping edge 86 which is interrupted by rectangular recesses 87. Relative to the axis direction 73, the recesses 87 are disposed at those locations where the roller 72 is provided with the rings 76 comprising the needles 80. This way, the stripping edge 86 can be arranged as closely as possible near the top of the roller 72 without leading to a collision with the needles 80. As shown in FIG. 1, above the stripping plate 85 is located a hold-down device 88 for holding down the strips 12 stripped off the needles 80. Said hold-down device 88 comprises a plate 90 which is articulated to a joint 89 and is height-adjustable by means of pneumatic cylinders 91 at its end opposite to the direction 8 for adjusting the inclination angle of the plate 90. Seen in the direction 8 directly behind the stripping plate 85, there is an endless, driven conveyor belt 94 which is deflected by means of two deflection rollers 92, 93. The roller 92 is driven for rotation by means of a motor 95. Above the conveyor belt 94, there is a second conveyor belt 96 which is parallel thereto and deflected by means of deflection rollers 97, 98, wherein the roller 97 is driven by means of a motor 99. Between the conveyor belts 94 and 96 is formed a gap 100 through which the produced corrugated honeycomb cardboard 1 is discharged in the direction 8. The conveyor belt 96 and the deflection rollers 97, 98 are fastened to a common frame 101 which is height-adjustable by means of height adjustment devices 102, 103. This way, the width of the gap 100 is adjustable and adaptable to the respective thickness of the corrugated honeycomb cardboard 1.

Seen in the direction 8 behind the device 15, there is a cutting device (not shown) for producing sheets of corrugated honeycomb cardboard 1, as it is generally known from corrugated cardboard machines, for instance from DE 103 12 600 A1. The sheets are stacked in a stacking device (not shown).

The following describes the functioning of the machine for producing corrugated honeycomb cardboard 1. Glued together to form a block 2, sheets of corrugated cardboard are supplied to the block supplying device 16, wherein the topmost web of the block 2 is advantageously a corrugated web 3 while the bottommost web of the block 2 is a liner 4. The channels 7 in the block 2 are all parallel to each other, extending horizontally and along the direction 8. The conveyor belts 17 and 22 move the block 2 in a slip-free manner in the direction 8 but are also able to move the block 2 in a direction opposite to the direction 8. As soon as the front edge of the block 2 pointing in the direction 8 has reached the level of the circular knife 39, several pins 49 are extended in a uniformly distributed manner across the width of the work table 40 so as to be in contact with the front end of the block 2. Afterwards, strips 12 are cut out from the block 2 by means of the circular knife 39, wherein the block 2 is advanced across a particular distance by means of the belts 17, 22 after each cut, causing the extended pins 49, which are in contact with the front end of the block 2, to follow accordingly. Once the respective advance is complete, another cut is performed by the circular knife 39, resulting in another strip. After a particular number of cuts, for instance 20 cuts, the block 2 is moved back opposite to the direction 8 by means of the belts 17, 22. Afterwards, pins 49 of respective slides 48 are extended directly behind the rearmost slice 12 such that the group of adjacent strips 12 is delimited by pins in and opposite to the direction 8, as for example shown in FIG. 3. The cluster 104 of adjacent strips 12 thus formed is now moved in the direction 8 by the synchronous movement of the respective slides 48. The cluster 104 is passed below the glue application roller 59 which applies glue to the upper elevations of the topmost corrugated web 3. The advantage of applying glue to the elevations of the corrugated web 3 is that less glue is required than for the liners 4. Applying glue to the elevations of the corrugated webs 3 ensures that glue is applied only in those regions where it will ultimately be required. In this process, the glue passes from the space 69 through the gap between the rollers 59 and 61 before reaching the gluing gap 70. Afterwards, the cluster 104 is moved in the direction 8 towards the corrugated-cardboard-strip turning device 15. The roller 72 is in the position shown in FIG. 7, with the needles 80 being disposed directly above the work table 40. When seen in the direction 8, the first strip 12 is pressed onto the needles 80 by means of the extended pins 49 at the rear end of the cluster 104. Before that, the pins 49 delimiting the front end of the cluster 104 had been retracted. In case the pressing force applicable to the rear end of the cluster 104 by means of the pins 49 does not suffice for pressing a strip 12 onto the needles 80, the rear pins 49 can be retracted as well. They would then be replaced by a beam (not shown) which presses the cluster 104 onto the pins 80 across the entire width of the roller 72. As soon as a strip 12 has been pressed onto the needles 80, the roller 72 is rotated in the direction of rotation 81 until the strip 12 pinned to the needles 80 comes into contact with the stripping edge 86 which strips the strip 12 off the needles 80. The engaged needles 80 are rotated through the recess 87 so as to be disengaged from the strip 12. Afterwards, the strip 12, which has been turned through 90°, is displaced by means of the beam 82 along the plate 85 in the direction 8 so as to pressed and glued to the strip 12 disposed in front thereof. This results in a theoretically endless web of corrugated honeycomb cardboard 1. FIG. 10 shows two strips 12 of the block 2 which are glued to each other. The corrugated honeycomb cardboard 1 is discharged by means of the conveyor belts 94 and 96 in the direction 8 before it is cut into sheets which are stacked.

As already described at the outset, the corrugated honeycomb cardboard 1 has numerous advantageous properties, such as a high stiffness with respect to forces acting perpendicular to plane 10. The corrugated honeycomb cardboard 1 is applicable as an insulating material, construction material, etc, and has a very low weight in relation to its external volume.

What is claimed is:

1. A device for conveying strips (12) of corrugated cardboard, the device comprising
   a. a work table (40) for conveying strips (12) on the work table (40) along a direction of conveyance (8), the work table (40) being supported on a floor;
   b. wherein the work table (40) comprises at least one longitudinal groove (50) for accommodating an element which is displaceable therein, and
   c. at least one slide (48) which is disposed underneath the work table (40) and is actuable for displacement in the direction of conveyance (8);
   d. which slide (48) comprises an element which is actuable for upward extension through the at least one longitudinal groove (50) for cooperation with the strip (12),
   wherein in the work table (40) are provided vacuum channels (42) with upwardly open bores (41) for the conveyed strips (12) to be held by suction.

2. A device according to claim 1, wherein several parallel longitudinal grooves (50) are disposed in the work table (40).

3. A device according to claim 2, wherein slides (48) are provided which belong to the longitudinal grooves (50).

4. A device according to claim 3, wherein the slides (48) are actuable for at least one of forward and reverse displacement by means of conveyor belts (44) which are actuable separately.

5. A device according to claim 1, wherein the vacuum channels (42) extend along the direction of conveyance (8).

6. A device according to claim 1, wherein the position of the slides (48) is changeable relative to the work table (40).

7. A device according to claim 6, wherein the slides (48) are height-adjustable.

8. A device according to claim 1, wherein the displaceable elements are pins (49).

9. A method of conveying strips (12) of corrugated cardboard, the method comprising the following steps:
   providing a device according to claim 1;
   extending elements in the direction of conveyance (8) so as to be positioned in front a group of strips (12) to be conveyed,
   extending elements behind a group of strips (12) to be conveyed,
   conveying the group of strips (12) along the direction of conveyance (8).

* * * * *